(12) United States Patent
Yount et al.

(10) Patent No.: US 7,829,653 B2
(45) Date of Patent: Nov. 9, 2010

(54) HORIZONTAL TRAYED REACTOR

(75) Inventors: Thomas Lloyd Yount, Kingsport, TN (US); Bruce Roger DeBruin, Lexington, SC (US); Larry Cates Windes, Kingsport, TN (US); Roy Douglas Flores, Irmo, SC (US); Alan Wayne White, Kingsport, TN (US); Steven Paul Bellner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 595 days.

(21) Appl. No.: 11/776,591

(22) Filed: Jul. 12, 2007

(65) Prior Publication Data

US 2009/0018280 A1  Jan. 15, 2009

(51) Int. Cl.
*C08G 63/02* (2006.01)
*C08G 63/00* (2006.01)

(52) U.S. Cl. ............... 528/272; 422/129; 422/131; 422/137; 422/138; 526/64; 528/171; 528/176; 528/271; 528/308.1

(58) Field of Classification Search ............ 422/129, 422/131, 137, 138; 526/64; 528/171, 176, 528/271, 272, 308.1
See application file for complete search history.

(56) References Cited

U.S. PATENT DOCUMENTS

| | | |
|---|---|---|
| 1,422,182 A | 7/1922 | Curme |
| 2,361,717 A | 10/1944 | Taylor |
| 2,614,648 A | 10/1952 | Wilson |
| 2,709,642 A | 5/1955 | Mann, Jr. et al. |
| 2,727,882 A | 12/1955 | Vodonik |
| 2,753,249 A | 7/1956 | Idenden et al. |
| 2,820,815 A | 1/1958 | Matuszak et al. |
| 2,829,153 A | 4/1958 | Vodonik |
| 2,905,707 A | 9/1959 | Hurt et al. |
| 2,973,341 A | 2/1961 | Hippe et al. |
| 3,044,993 A | 7/1962 | Tiemersma |
| 3,052,711 A | 9/1962 | Glogau et al. |
| 3,054,776 A | 9/1962 | Higgins |
| 3,110,547 A | 11/1963 | Emmert |
| 3,113,843 A | 12/1963 | Li |
| 3,161,710 A | 12/1964 | Turner |
| 3,174,830 A | 3/1965 | Watzl et al. |
| 3,185,668 A | 5/1965 | Meyer et al. |
| 3,192,184 A | 6/1965 | Brill et al. |
| 3,241,926 A | 3/1966 | Parker et al. |
| 3,250,747 A | 5/1966 | Mitchell, Jr. et al. |
| 3,251,657 A | 5/1966 | Bachmann et al. |
| 3,254,965 A | 6/1966 | Ogle |
| 3,376,353 A | 4/1968 | Tate |
| 3,385,881 A | 5/1968 | Bachmann et al. |
| 3,390,965 A | 7/1968 | Ditmar |
| 3,402,023 A | 9/1968 | Dobo |
| 3,427,287 A | 2/1969 | Pengilly |
| 3,438,942 A | 4/1969 | Scheller |
| 3,442,868 A | 5/1969 | Ogata et al. |
| 3,458,467 A | 7/1969 | Herrle et al. |
| 3,468,849 A | 9/1969 | Rothert |
| 3,480,587 A | 11/1969 | Porter |
| 3,487,049 A | 12/1969 | Busot |
| 3,496,146 A | 2/1970 | Mellichamp, Jr. |
| 3,496,159 A | 2/1970 | Spence |
| 3,496,220 A | 2/1970 | McCarty et al. |
| 3,497,473 A | 2/1970 | Kemkes |
| 3,507,905 A | 4/1970 | Girantet et al. |
| 3,509,203 A | 4/1970 | Michaelis et al. |
| 3,511,615 A | 5/1970 | Roget et al. |
| 3,522,214 A | 7/1970 | Crawford et al. |
| 3,534,082 A | 10/1970 | Armstrong et al. |
| 3,551,396 A | 12/1970 | Lanthier |
| 3,582,244 A | 6/1971 | Siclari et al. |
| 3,590,070 A | 6/1971 | Martin et al. |
| 3,590,072 A | 6/1971 | Leybourne |
| 3,595,846 A | 7/1971 | Rouzier |
| 3,600,137 A | 8/1971 | Girantet et al. |
| 3,609,125 A | 9/1971 | Fujimoto et al. |
| 3,639,448 A | 2/1972 | Matsuzawa et al. |
| 3,644,096 A | 2/1972 | Lewis et al. |
| 3,644,294 A | 2/1972 | Siclari et al. |
| 3,644,483 A | 2/1972 | Griehl et al. |
| 3,646,102 A | 2/1972 | Kobayashi et al. |

(Continued)

FOREIGN PATENT DOCUMENTS

BE  780142  3/1972

(Continued)

OTHER PUBLICATIONS

Copending U.S. Appl. No. 11/506,105, filed Aug. 17, 2006, Bruce Roger DeBruin.

(Continued)

*Primary Examiner*—Terressa M Boykin
(74) *Attorney, Agent, or Firm*—Jennifer R. Knight; Bernard J. Graves, Jr.

(57) ABSTRACT

A horizontal trayed reactor operable to facilitate a chemical reaction in a reaction medium flowing therethrough. The reactor can include a plurality of vertically spaced trays disposed within the horizontally elongated vessel shell. The reaction medium can flow in generally opposite directions on vertically adjacent trays so that the reaction medium flows generally back-and-forth through the reactor.

58 Claims, 2 Drawing Sheets

U.S. PATENT DOCUMENTS

| | | | |
|---|---|---|---|
| 3,647,758 A | 3/1972 | Ryffel et al. | |
| 3,651,125 A | 3/1972 | Lewis et al. | |
| 3,676,485 A | 7/1972 | Lewis et al. | |
| 3,684,459 A | 8/1972 | Tate et al. | |
| 3,689,461 A | 9/1972 | Balint et al. | |
| 3,697,579 A | 10/1972 | Balint et al. | |
| 3,723,391 A | 3/1973 | Beer et al. | |
| 3,740,267 A | 6/1973 | Haylock et al. | |
| 3,781,213 A | 12/1973 | Siclari et al. | |
| 3,787,479 A | 1/1974 | Grehl et al. | |
| 3,819,585 A | 6/1974 | Funk et al. | |
| 3,841,836 A | 10/1974 | Lunsford et al. | |
| 3,849,379 A | 11/1974 | Jeurissen et al. | |
| 3,867,349 A | 2/1975 | Heeg et al. | |
| 3,892,798 A | 7/1975 | Heeg et al. | |
| 3,927,982 A | 12/1975 | Chapman et al. | |
| 3,927,983 A | 12/1975 | Gordon et al. | |
| 3,960,820 A | 6/1976 | Pinney | |
| 3,988,301 A | 10/1976 | Jeurissen et al. | |
| 4,001,187 A | 1/1977 | Itabashi et al. | |
| 4,008,048 A | 2/1977 | Hellemans et al. | |
| 4,019,866 A | 4/1977 | Jaswal et al. | |
| 4,020,049 A | 4/1977 | Rinehart | |
| 4,028,307 A | 6/1977 | Ure | |
| 4,032,563 A | 6/1977 | Harper et al. | |
| 4,039,515 A | 8/1977 | Rebhan et al. | |
| 4,046,718 A | 9/1977 | Mass et al. | |
| 4,049,638 A | 9/1977 | Doerfel et al. | |
| 4,056,514 A | 11/1977 | Strehler et al. | |
| 4,064,112 A | 12/1977 | Rothe et al. | |
| 4,077,945 A | 3/1978 | Heinze et al. | |
| 4,079,046 A | 3/1978 | Brignac et al. | |
| 4,089,888 A | 5/1978 | Tokumitsu et al. | |
| 4,097,468 A | 6/1978 | James et al. | |
| 4,100,142 A | 7/1978 | Schaefer et al. | |
| 4,110,316 A | 8/1978 | Edging et al. | |
| 4,118,582 A | 10/1978 | Walker | |
| 4,122,112 A | 10/1978 | Koda et al. | |
| 4,146,729 A | 3/1979 | Goodley et al. | |
| 4,148,693 A | 4/1979 | Williamson | |
| 4,196,168 A | 4/1980 | Lewis | |
| 4,200,145 A | 4/1980 | Underwood | |
| 4,204,070 A | 5/1980 | Suzuki et al. | |
| 4,212,963 A | 7/1980 | Lehr et al. | |
| 4,223,124 A | 9/1980 | Broughton et al. | |
| 4,230,818 A | 10/1980 | Broughton, Jr. et al. | |
| 4,235,844 A | 11/1980 | Sterzel et al. | |
| 4,238,593 A | 12/1980 | Duh | |
| 4,254,246 A | 3/1981 | Dicoi et al. | |
| 4,289,871 A | 9/1981 | Rowan et al. | |
| 4,289,895 A | 9/1981 | Burkhardt et al. | |
| 4,339,570 A | 7/1982 | Muschelknautz et al. | |
| 4,346,193 A | 8/1982 | Warfel | |
| 4,361,462 A | 11/1982 | Fujii et al. | |
| 4,365,078 A | 12/1982 | Shelley | |
| 4,382,139 A | 5/1983 | Kapteina et al. | |
| 4,383,093 A | 5/1983 | Shiraki et al. | |
| 4,410,750 A | 10/1983 | Langer, Jr. | |
| 4,424,301 A | 1/1984 | Klippert et al. | |
| 4,440,924 A | 4/1984 | Kuze et al. | |
| 4,452,956 A | 6/1984 | Moked et al. | |
| 4,472,558 A | 9/1984 | Casper et al. | |
| 4,499,226 A | 2/1985 | Massey et al. | |
| 4,529,787 A | 7/1985 | Schmidt et al. | |
| 4,542,196 A | 9/1985 | Morris et al. | |
| 4,548,788 A | 10/1985 | Morris et al. | |
| 4,550,149 A | 10/1985 | Morris et al. | |
| 4,551,309 A | 11/1985 | Morris et al. | |
| 4,551,510 A | 11/1985 | Morris et al. | |
| 4,554,343 A | 11/1985 | Jackson, Jr. et al. | |
| 4,555,384 A | 11/1985 | Morris et al. | |
| 4,588,560 A | 5/1986 | Degnan et al. | |
| 4,612,363 A | 9/1986 | Sasaki et al. | |
| 4,670,580 A | 6/1987 | Maurer | |
| 4,675,377 A | 6/1987 | Mobley et al. | |
| 4,680,345 A | 7/1987 | Kobayashi et al. | |
| 4,680,376 A | 7/1987 | Heinze et al. | |
| 4,721,575 A | 1/1988 | Binning et al. | |
| 4,952,302 A | 8/1990 | Leach | |
| 4,952,627 A | 8/1990 | Morita et al. | |
| 4,973,655 A | 11/1990 | Pipper et al. | |
| 5,002,116 A | 3/1991 | Hoagland et al. | |
| 5,037,955 A | 8/1991 | Dighton | |
| 5,041,525 A | 8/1991 | Jackson | |
| 5,064,935 A | 11/1991 | Jackson et al. | |
| 5,110,325 A * | 5/1992 | Lerner | 95/213 |
| 5,162,488 A | 11/1992 | Mason | |
| 5,185,426 A | 2/1993 | Verheijen et al. | |
| 5,194,525 A | 3/1993 | Miura et al. | |
| 5,202,463 A | 4/1993 | Ruszkay | |
| 5,236,558 A | 8/1993 | Buyalos et al. | |
| 5,243,022 A | 9/1993 | Kim et al. | |
| 5,245,057 A | 9/1993 | Shirtum | |
| 5,254,288 A | 10/1993 | Verheijen et al. | |
| 5,294,305 A | 3/1994 | Craft, Sr. et al. | |
| 5,300,626 A | 4/1994 | Jehl et al. | |
| 5,324,853 A | 6/1994 | Jones et al. | |
| 5,340,906 A | 8/1994 | Shirokura et al. | |
| 5,340,907 A | 8/1994 | Yau et al. | |
| 5,384,389 A | 1/1995 | Alewelt et al. | |
| 5,385,773 A | 1/1995 | Yau et al. | |
| 5,413,861 A | 5/1995 | Gallo | |
| 5,434,239 A | 7/1995 | Bhatia | |
| 5,464,590 A | 11/1995 | Yount et al. | |
| 5,466,419 A | 11/1995 | Yount et al. | |
| 5,466,765 A | 11/1995 | Haseltine et al. | |
| 5,466,776 A | 11/1995 | Krautstrunk et al. | |
| 5,476,919 A | 12/1995 | Schaeffer | |
| 5,478,909 A | 12/1995 | Jehl et al. | |
| 5,480,616 A | 1/1996 | Richardson et al. | |
| 5,484,882 A | 1/1996 | Takada et al. | |
| 5,496,469 A | 3/1996 | Scraggs et al. | |
| 5,519,112 A | 5/1996 | Harazoe et al. | |
| 5,536,856 A | 7/1996 | Harrison et al. | |
| 5,573,820 A | 11/1996 | Harazoe et al. | |
| 5,594,077 A | 1/1997 | Groth et al. | |
| 5,599,900 A | 2/1997 | Bhatia | |
| 5,602,216 A | 2/1997 | Juvet | |
| 5,648,437 A | 7/1997 | Fischer et al. | |
| 5,650,536 A | 7/1997 | Dankworth et al. | |
| 5,681,918 A | 10/1997 | Adams et al. | |
| 5,688,898 A | 11/1997 | Bhatia | |
| 5,739,219 A | 4/1998 | Fischer et al. | |
| 5,750,079 A | 5/1998 | Ueda et al. | |
| 5,753,190 A | 5/1998 | Haseltine et al. | |
| 5,753,784 A | 5/1998 | Fischer et al. | |
| 5,786,443 A | 7/1998 | Lowe | |
| 5,811,496 A | 9/1998 | Iwasyk et al. | |
| 5,816,700 A | 10/1998 | Starke, Sr. et al. | |
| 5,830,981 A | 11/1998 | Koreishi et al. | |
| 5,849,849 A | 12/1998 | Bhatia | |
| 5,889,127 A | 3/1999 | Iiyama et al. | |
| 5,898,058 A | 4/1999 | Nichols et al. | |
| 5,902,865 A | 5/1999 | Gausepohl et al. | |
| 5,905,096 A | 5/1999 | Lay et al. | |
| 5,922,828 A | 7/1999 | Schiraldi | |
| 5,932,105 A | 8/1999 | Kelly | |
| 6,069,228 A | 5/2000 | Alsop et al. | |
| 6,096,838 A | 8/2000 | Nakamoto et al. | |
| 6,100,369 A | 8/2000 | Miyajima et al. | |
| 6,103,859 A | 8/2000 | Jernigan et al. | |
| 6,111,035 A | 8/2000 | Sakamoto et al. | |
| 6,111,064 A | 8/2000 | Maurer et al. | |
| 6,113,997 A | 9/2000 | Massey et al. | |

| | | | | | | |
|---|---|---|---|---|---|---|
| 6,127,493 | A | 10/2000 | Maurer et al. | GB | 1122538 | 8/1968 |
| 6,174,970 | B1 | 1/2001 | Braune | GB | 1154538 | 6/1969 |
| 6,252,034 | B1 | 6/2001 | Uenishi et al. | GB | 1 277 376 | 6/1972 |
| 6,339,031 | B1 | 1/2002 | Tan | GB | 1320769 | 6/1973 |
| 6,355,738 | B2 | 3/2002 | Nakamachi | GB | 2010294 | 6/1979 |
| 6,359,106 | B1 | 3/2002 | Nakamoto et al. | GB | 2020194 | 11/1979 |
| 6,399,031 | B1 | 6/2002 | Herrmann et al. | GB | 2 052 535 | 1/1981 |
| 6,458,916 | B1 | 10/2002 | Yamaguchi et al. | GB | 2052535 | 1/1981 |
| 6,545,176 | B1 | 4/2003 | Tsay et al. | JP | 42 4993 B | 3/1967 |
| 6,551,517 | B1 | 4/2003 | Sentagnes et al. | JP | 42 18353 B | 9/1967 |
| 6,576,774 | B2 | 6/2003 | Scardino et al. | JP | 47 39043 A | 4/1971 |
| 6,590,062 | B2 | 7/2003 | Yamaguchi et al. | JP | 48 94795 A | 12/1973 |
| 6,623,643 | B2 | 9/2003 | Chisholm et al. | JP | 49 28698 A | 3/1974 |
| 6,631,892 | B1 | 10/2003 | Erickson | JP | 49 34593 A | 3/1974 |
| 6,642,407 | B2 | 11/2003 | Rao et al. | JP | 49 105893 A | 10/1974 |
| 6,703,454 | B2 | 3/2004 | Debruin | JP | 50 82197 A | 7/1975 |
| 6,723,826 | B2 | 4/2004 | Yamaguchi et al. | JP | 51 29460 A | 3/1976 |
| 6,814,944 | B1 | 11/2004 | Matsui et al. | JP | 51 100036 A | 9/1976 |
| 6,815,525 | B2 | 11/2004 | Debruin | JP | 51 136788 A | 11/1976 |
| 6,861,494 | B2 | 3/2005 | Debruin | JP | 51 136789 A | 11/1976 |
| 6,906,164 | B2 | 6/2005 | Debruin | JP | 52 51495 A | 4/1977 |
| 6,916,939 | B2 | 7/2005 | Yamane et al. | JP | 52 71432 A | 6/1977 |
| 7,008,546 | B2 | 3/2006 | Edmondson | JP | 52 78845 A | 7/1977 |
| 7,049,462 | B2 | 5/2006 | Nagare et al. | JP | 52 83424 A | 7/1977 |
| 7,074,879 | B2 | 7/2006 | Debruin et al. | JP | 52 87133 A | 7/1977 |
| 7,658,817 | B2 | 2/2010 | Fukuoka et al. | JP | 53 31793 A | 3/1978 |
| 2002/0128399 | A1 | 9/2002 | Nakamoto et al. | JP | 53 34894 A | 3/1978 |
| 2002/0161166 | A1 | 10/2002 | Nakane et al. | JP | 54 41833 A | 4/1979 |
| 2002/0180099 | A1 | 12/2002 | Keillor, III | JP | 54 76535 A | 6/1979 |
| 2003/0037910 | A1 | 2/2003 | Smyrnov | JP | 54 79242 A | 6/1979 |
| 2003/0104203 | A1 | 6/2003 | Tam et al. | JP | 54 100494 A | 8/1979 |
| 2003/0133856 | A1 | 7/2003 | Le | JP | 54 157536 A | 12/1979 |
| 2003/0191326 | A1 | 10/2003 | Yamane et al. | JP | 55 43128 A | 3/1980 |
| 2004/0068070 | A1 | 4/2004 | Martan et al. | JP | 55 108422 A | 8/1980 |
| 2004/0197618 | A1 | 10/2004 | Harada et al. | JP | 55 135133 A | 10/1980 |
| 2004/0249111 | A1 | 12/2004 | Debruin | JP | 58 129020 A | 8/1983 |
| 2005/0059782 | A1 | 3/2005 | Andrist et al. | JP | 59 47226 A | 3/1984 |
| 2005/0222371 | A1 | 10/2005 | Wilhelm et al. | JP | 59 53530 A | 3/1984 |
| 2006/0008661 | A1 | 1/2006 | Wijesundara et al. | JP | 59 68326 A | 4/1984 |
| 2006/0251546 | A1 | 11/2006 | Yount et al. | JP | 59 71326 A | 4/1984 |
| 2006/0251547 | A1 | 11/2006 | Windes et al. | JP | 60 15421 A | 1/1985 |
| 2007/0037959 | A1 | 2/2007 | DeBruin | JP | 60 72845 A | 4/1985 |
| 2007/0065211 | A1 | 3/2007 | Kawaguchi | JP | 60 115551 A | 6/1985 |
| 2008/0139760 | A1 | 6/2008 | DeBruin | JP | 60 120839 A | 6/1985 |
| | | | | JP | 60 163918 A | 8/1985 |
| | | FOREIGN PATENT DOCUMENTS | | JP | 60 226846 A | 11/1985 |
| | | | | JP | 62 207325 A | 9/1987 |
| BR | | 7906279 | 7/1981 | JP | 62 292831 A | 12/1987 |
| DE | | 2200832 | 1/1972 | JP | 64 56726 A | 3/1989 |
| DE | | 125 798 | 5/1977 | JP | 1 102044 A | 4/1989 |
| DE | | 126 073 | 6/1977 | JP | 3 192118 A | 8/1991 |
| DE | | 146 298 | 2/1981 | JP | 3 292323 A | 12/1991 |
| DE | | 206 558 | 2/1984 | JP | 5-78402 | 3/1993 |
| DE | | 229 415 | 11/1985 | JP | 5 155994 A | 6/1993 |
| DE | | 4235785 A1 | 5/1994 | JP | 6 247899 A | 9/1994 |
| DE | | 195 25 579 | 12/1996 | JP | 7 118208 A | 5/1995 |
| DE | | 195 37 930 | 4/1997 | JP | 7 173268 A | 7/1995 |
| DE | | 103 36 164 A1 | 3/2005 | JP | 7 238151 A | 9/1995 |
| DE | | 10 2004 038 466 | 10/2005 | JP | 7 313 865 | 12/1995 |
| DE | | 10 2004 034 708 A1 | 2/2006 | JP | 8 198960 A | 8/1996 |
| EP | | 0 070 707 A1 | 1/1983 | JP | 8 283398 A | 10/1996 |
| EP | | 0 105 111 | 7/1983 | JP | 10 36495 A | 2/1998 |
| EP | | 0 105 111 A1 | 7/1983 | JP | 10 259244 A | 9/1998 |
| EP | | 0 850 962 A2 | 7/1998 | JP | 11 092555 A | 4/1999 |
| EP | | 0 999 228 A2 | 5/2000 | JP | 11 106489 A | 4/1999 |
| EP | | 1 065 193 A1 | 1/2001 | JP | 11 217429 A | 8/1999 |
| FR | | 2168990 | 9/1973 | JP | 2000/095851 A | 4/2000 |
| FR | | 2302778 A1 | 3/1975 | JP | 2004 238329 | 8/2004 |
| GB | | 777 128 | 6/1957 | KR | 1993-0005144 B1 | 6/1993 |
| GB | | 777 628 | 6/1957 | KR | 1994-0011540 B1 | 3/1994 |
| GB | | 1001787 | 8/1965 | NL | 6704303 | 9/1967 |
| GB | | 1013034 | 12/1965 | PL | 136188 | 8/1987 |
| GB | | 1055918 | 1/1967 | SU | 973552 | 11/1982 |

| WO | 95/29752 | 11/1995 |
| WO | WO 96/22318 | 7/1996 |
| WO | WO 98/08602 | 3/1998 |
| WO | WO 98/10007 | 3/1998 |
| WO | WO 99/16537 | 4/1999 |
| WO | 99/39815 | 8/1999 |
| WO | WO 02/26841 A1 | 4/2002 |
| WO | WO 02/46266 A2 | 6/2002 |
| WO | WO 02/096975 A1 | 12/2002 |
| WO | WO 03/006526 A1 | 1/2003 |
| WO | 2004/111104 | 12/2004 |
| WO | WO 2006 007966 A1 | 2/2006 |
| WO | WO 2006/083250 A1 | 8/2006 |
| WO | 2007/065211 | 6/2007 |

OTHER PUBLICATIONS

Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/820,244, filed Jun. 19, 2007, Bruce Roger DeBruin.
Copending U.S. Appl. No. 11/891,149, filed Aug. 9, 2007, Bruce Roger DeBruin.
Copending U.S. Appl. No. 11/635,411, filed Dec. 7, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/919,931, filed Aug. 17, 2004, Bruce Roger DeBruin.
Copending U.S. Appl. No. 11/776,597, filed Jul. 12, 2007, Bruce Roger DeBruin.
Copending U.S. Appl. No. 11/776,599, filed Jul. 12, 2007, Bruce Roger DeBruin et al.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,603, filed Jul. 12, 2007, Bruce Roger DeBruin et al.
Copending U.S. Appl. No. 11/715,564, filed Mar. 8, 2007, Bruce Roger DeBruin.
Copending U.S. Appl. No. 11/715,546, filed Mar. 8, 2007, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
USPTO office action dated Oct. 23, 2006 for copending U.S. Appl. No. 10/919,931.
USPTO office action dated Jun. 14, 2007 for copending U.S. Appl. No. 11/635,411.
USPTO office action dated Jul. 2, 2007 for copending U.S. Appl. No. 11/506,131.
USPTO office action dated Jul. 2, 2007 for copending U.S. Appl. No. 11/506,132.
USPTO office action dated Jul. 2, 2007 for copending U.S. Appl. No. 11/506,105.
USPTO Notice of Allowance dated Oct. 11, 2007 for copending U.S. Appl. No. 10/919,931.
USPTO office action dated Oct. 11, 2007 for copending U.S. Appl. No. 11/820,244.
USPTO office action dated Dec. 4, 2007 for copending U.S. Appl. No. 11/891,149.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Office Action dated Jan. 25, 2008 for copending U.S. Appl. No. 11/506,105.
USPTO Notice of Allowance dated Feb. 13, 2008 for copending U.S. Appl. No. 11/820,244.
USPTO Notice of Allowance dated Mar. 25, 2008 for copending U.S. Appl. No. 11/506,132.
Perry, Robert H. and Green, Don, "Flow in Pipes and Channels," Perry's Chemical Engineer's Handbook, 1984, pp. 5-23, $6^{th}$ Edition, McGraw-Hill, United States.
Perry, Robert H. and Green, Don, "Fluid and Particle Mechanics," Perry's Chemical Engineer's Handbook, 1984, pp. 5-40 to 5-41, $6^{th}$ Edition, McGraw-Hill, United States.
Perry, Robert H. and Green, Don, "Fluid and Particle Mechanics," Perry's Chemical Engineer's Handbook, 1984, 14-82 to 14-95, $6^{th}$ Edition, McGraw-Hill, United States.
Nauman, E.B., "Enhancement of Heat Transfer and Thermal Homogenity with Motionless Mixers," American Institute of Chemical Engineer's Journal, 1979, pp. 246-258, vol. 25, No. 2.
Brodkey, Robert S., "Multiphase Pheonomena I: Pipe Flow," The Phenomena of Fluid Motions, 1967, pp. 456-538, Addison-Wesley Publishing Company, United States.
Gupta, S.K. and Kumar, Anil, "Polyester Reactors," Plenum Chemical Engineering Series, 1987, Chapter 8, pp. 241-318, Plenum Press, New York.
Stahl, Wegmann, Von Rohr, Tubular Reactor for Liquid Reactions with Gas Release, 2003, Catalysis Today, 79-80, pp. 89-95.
USPTO Notice of Allowance dated Apr. 29, 2008 for copending U.S. Appl. No. 11/891,149.
Office Action dated May 7, 2008 for copending U.S. Appl. No. 11/506,105.
USPTO Office Action dated May 7, 2008 for copending U.S. Appl. No. 11/506,105.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
Santosh K. Gupta & Anil Kumar, "Step Growth Polymerization," The Plenum Chemical Engineering Series, 1987, Chapter 8, Plenum Press.
USPTO Supplemental Notice of Allowability dated Aug. 27, 2008 in copending U.S. Appl. No. 11/820,244.
USPTO Notice of Allowance dated Jun. 11, 2008 in copending U.S. Appl. No. 11/506,132.
USPTO Notice of Allowance dated Mar. 17, 2008 in copending U.S. Appl. No. 11/506,131.
USPTO Supplemental Notice of Allowability dated Apr. 4, 2008 in copending U.S. Appl. No. 11/506,131.
USPTO Notice of Allowability dated Oct. 7, 2008 in copending U.S. Appl. No. 11/506,105.
USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
USPTO Office Action dated Jul. 18, 2008 for copending U.S. Appl. No. 11/506,346.
Ekivana, N.I. et al., "Structure Formation in Terephthalic Acid Pastes," 1968, Chemical Abstracts Service, Columbus OH.
USPTO Notice of Allowance dated Jan. 2, 2009 for copending U.S. Appl. No. 11/891,149.
USPTO Notice of Allowance dated Jan. 28, 2009 for copending U.S. Appl. No. 11/506,346.
USPTO Office Action dated Jan. 30, 2009 for copending U.S. Appl. No. 11/715,546.

USPTO Office Action dated Feb. 4, 2009 for copending U.S. Appl. No. 11/635,411.
USPTO Notice of Allowance dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
Perry's Chemical Engineers' Handbook, 7th Edition, pp. 8-49 to 8-50 and pp. 14-82 to 14-95, 1997, The McGraw-Hill Companies, Inc., United States.
USPTO Notice of Allowance dated Nov. 17, 2009 for copending U.S. Appl. No. 12/173,354.
USPTO Office Action dated Feb. 18, 2010 for copending U.S. Appl. No. 11/776,597.
USPTO Office Action dated Feb. 18, 2010 for copending U.S. Appl. No. 11/776,599.
USPTO Office Action dated Feb. 18, 2010 for copending U.S. Appl. No. 11/776,600.
USPTO Office Action dated Feb. 18, 2010 for copending U.S. Appl. No. 11/776,587.
USPTO Office Action dated Feb. 18, 2010 for copending U.S. Appl. No. 11/776,603.
USPTO Office Action dated Feb. 24, 2010 for copending U.S. Appl. No. 11/776,598.
USPTO Office Action dated Feb. 24, 2010 for copending U.S. Appl. No. 11/776,595.
USPTO Office Action dated Jan. 11, 2010 for copending U.S. Appl. No. 11/635,360.
USPTO Office Action dated Jan. 20, 2010 for copending U.S. Appl. No. 12/186,739.
International Search Report and Written Opinion for PCT/US2008/008339, dated Oct. 23, 2008.
USPTO Notice of Allowance dated Jun. 23, 2010 in copending U.S. Appl. No. 11/776,595.
USPTO Notice of Allowance dated Jun. 23, 2010 in copending U.S. Appl. No. 11/776,598.
USPTO Notice of Allowance dated Jun. 23, 2010 in copending U.S. Appl. No. 11/776,597.
USPTO Notice of Allowance dated Jun. 24, 2010 in copending U.S. Appl. No. 11/776,603.
USPTO Notice of Allowance dated Jun. 28, 2010 in copending U.S. Appl. No. 11/776,600.
USPTO Notice of Allowance dated Jun. 28, 2010 in copending U.S. Appl. No. 11/776,599.
USPTO Notice of Allowance dated Jul. 14, 2010 in copending U.S. Appl. No. 11/715,564.
USPTO Notice of Allowance dated Jul. 15, 2010 in copending U.S. Appl. No. 11/776,587.
USPTO Notice of Allowance dated Jul. 23, 2010 in copending U.S. Appl. No. 12/186,739.
USPTO Supplementary Notice of Allowance dated Sep. 21, 2010 in copending U.S. Appl. No. 11/715,564.

* cited by examiner

HORIZONTAL TRAYED REACTOR

BACKGROUND OF THE INVENTION

1. Field of the Invention

This invention relates to reactors for processing liquid-containing reaction mediums. In another aspect, the invention concerns polycondensation reactors used for melt-phase production of polyesters.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have led to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers and/or oligomers exiting the esterification stage are converted into a polymer product having the desired final average chain length.

In many conventional melt-phase polyester production facilities, esterification and polycondensation are carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance.

Thus, a need exists for a high efficiency polyester process that minimizes capital, operational, and maintenance costs while maintaining or enhancing product quality.

SUMMARY OF THE INVENTION

In one embodiment of the present invention, there is provided a process comprising: flowing a reaction medium through a reactor comprising a horizontally elongated vessel shell and a plurality of vertically spaced trays disposed in the vessel shell, wherein the reaction medium flows across at least two of the trays as the reaction medium passes through the reactor.

In another embodiment of the present invention, there is provided a process comprising: (a) introducing a predominantly liquid feed into a polycondensation reactor, wherein the feed forms a reaction medium in the reactor, wherein the feed comprises PET having an average chain length in the range of from about 5 to about 50; (b) subjecting the reaction medium to polycondensation in the reactor to thereby provide a predominantly liquid product and a vapor, wherein the vapor comprises a byproduct of the polycondensation, wherein the reactor comprises a substantially horizontal, elongated vessel shell and at least two substantially horizontal, vertically spaced trays disposed in the vessel shell, wherein at least a portion of the reaction medium flows across the trays as the reaction medium undergoes polycondensation, wherein the reaction medium flows in generally opposite directions on vertically adjacent ones of the trays and falls by gravity between the trays, wherein the vessel shell has a length-to-diameter (L:D) ratio in the range of from about 1.2:1 to about 30:1, wherein a majority of the trays has a length of at least about 0.5 L, wherein the vessel shell comprises a substantially cylindrical pipe and a pair of endcaps coupled to opposite ends of the pipe; (c) discharging the vapor from the reactor via a vapor outlet located near the top of the vessel shell; and (d) discharging the product from the reactor via a product outlet located near the bottom of the vessel shell, wherein the product comprises PET having an average chain length that is at least about 10 greater than the average chain length of the feed.

In a further embodiment of the present invention, there is provided a reactor comprising a horizontally elongated vessel shell and at least two vertically spaced trays disposed in the vessel shell.

BRIEF DESCRIPTION OF THE DRAWINGS

Certain embodiments of the present invention are described in detail below with reference to the enclosed figures, wherein.

DETAILED DESCRIPTION

Figure 1:
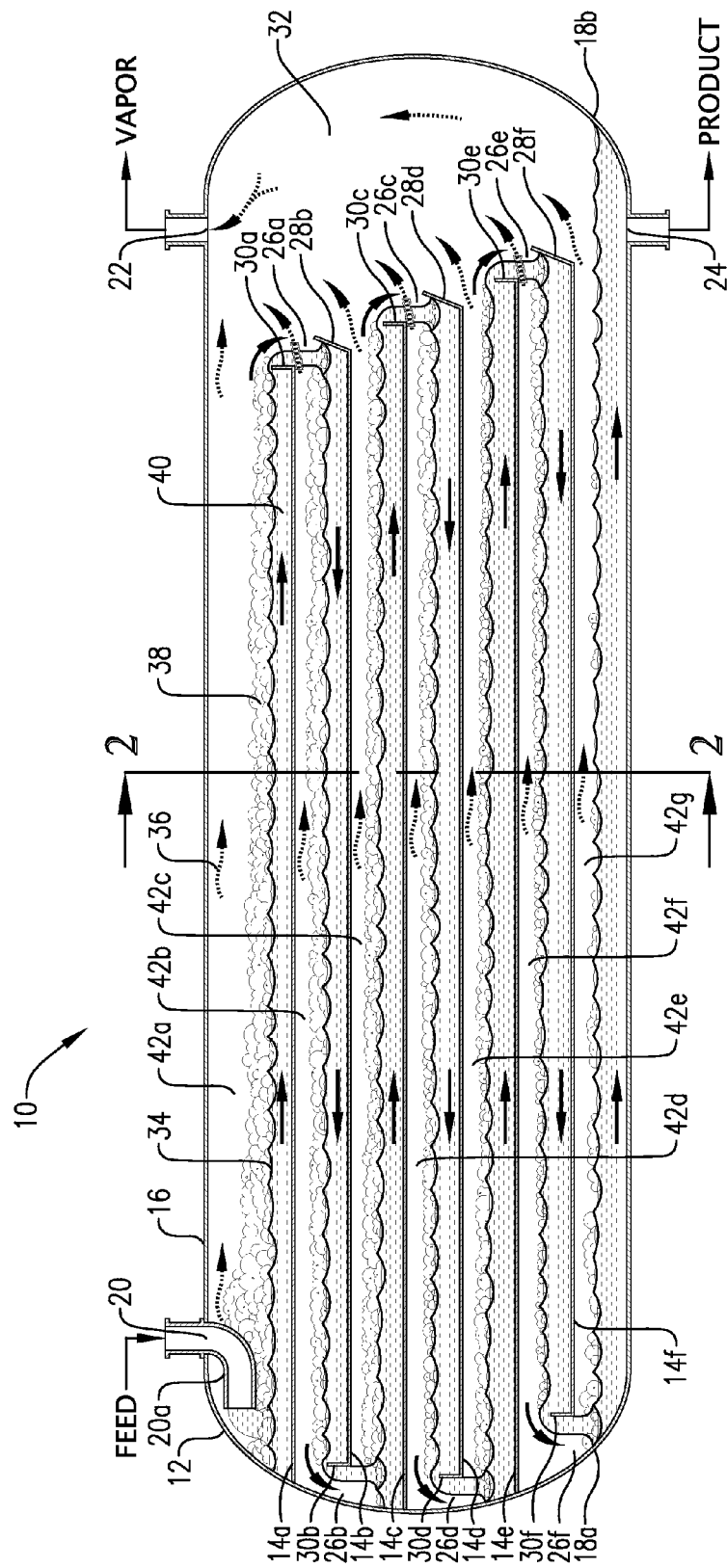
FIG. 1 is a schematic depiction of a horizontal trayed reactor in accordance with one embodiment of the present invention and suitable for use as a polycondensation reactor in a melt-phase polyester production facility.
Figure 2:
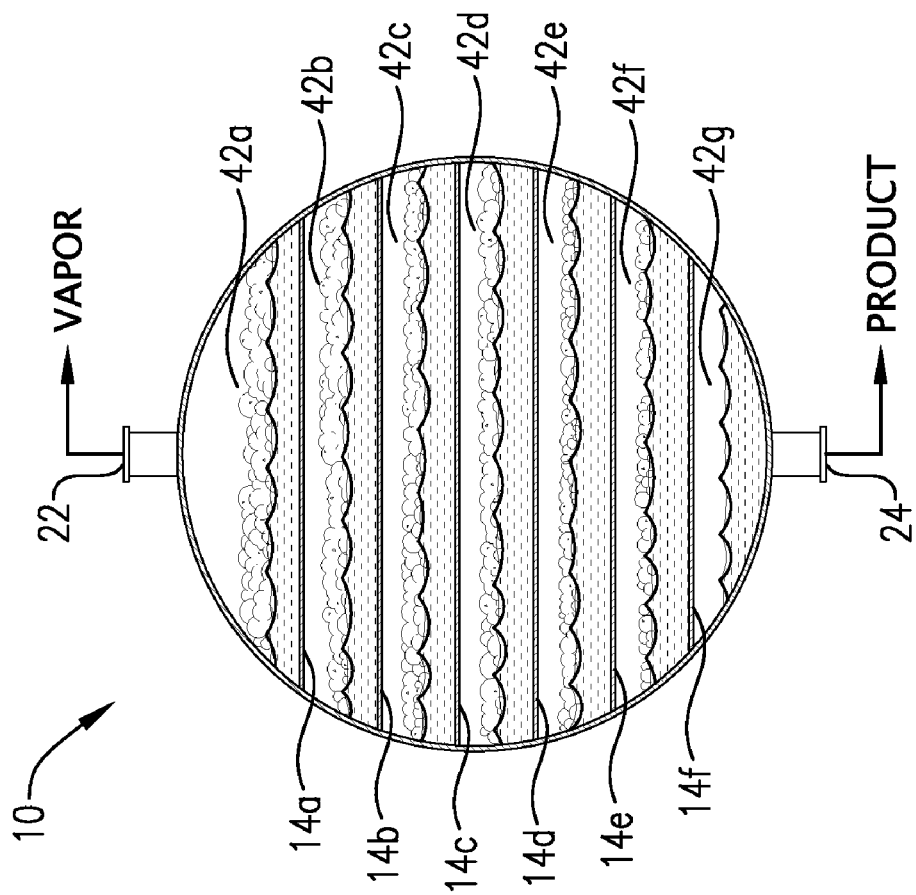
FIG. 2 is a sectional end view of the horizontal trayed reactor, taken along line 2-2 in FIG. 1.

FIGS. 1 and 2 illustrate an exemplary horizontal trayed reactor configured in accordance with one embodiment of the present invention. The configuration and operation of the reactor depicted in FIGS. 1 and 2 is described in detail below. Although certain portions of the following description relate primarily to reactors employed in a melt-phase polyester production process, reactors configured in accordance with embodiments of the present invention may find application in a wide variety of chemical processes. For example, reactors configured in accordance with certain embodiments of the present invention may be advantageously employed in any process where chemical reactions take place in the liquid phase of a reaction medium and a vapor byproduct is produced as a result of the chemical reaction. Further, reactors configured in accordance with certain embodiments of the present invention may be advantageously employed in chemical processes where at least a portion of the reaction medium forms foam during processing.

Referring now to FIG. 1, one embodiment of a horizontal trayed reactor 10 is illustrated as generally comprising a horizontally elongated vessel shell 12 and a series of vertically spaced trays 14a-f disposed within vessel shell 12.

Vessel shell 12 generally comprises a horizontally elongated tubular member 16 and a pair of end caps 18a and 18b coupled to opposite ends of tubular member 16. Vessel shell 12 defines a feed inlet 20, a vapor outlet 22, and a liquid product outlet 24. As illustrated in FIG. 1, feed inlet 20 and vapor outlet 22 can be located near the top of vessel shell 12, while liquid product outlet 24 can be located near the bottom of vessel shell 12. In one embodiment, feed inlet 20 can be located in or near one endcap, while vapor and product outlets 22 and 24 can be located in or near the opposite endcap. Further, an internal feed distributor 20a can be employed to discharge the feed toward endcap 18a, to thereby minimize and/or eliminate stagnant zones on upper tray 14a.

In the embodiment illustrated in FIG. 1, tubular member 16 is a substantially horizontal, substantially straight, substantially cylindrical pipe. In an alternative embodiment, tubular member 16 can have a variety of cross-sectional configurations (e.g., rectangular, square, or oval). Further, tubular member 16 need not have a perfectly horizontal orientation. For example, the central axis of elongation of tubular member 16 can extend within about 10, about 5, or 2 degrees of horizontal.

In the embodiment illustrated in FIG. 1, vessel shell 12 and/or tubular member 16 has a maximum internal length (L) that is greater than its maximum internal diameter (D). In one embodiment vessel shell 12 and/or tubular member 16 can have a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1. In one embodiment, D can be in the range of from about 2 to about 40 feet, about 6 to about 30 feet, or 10 feet to 20 feet, and L can be in the range of from about 5 to about 100 feet, about 10 to about 60 feet, or 15 feet to 40 feet.

As shown in FIG. 1, the series of trays 14*a-f* are disposed within and extend generally along a substantial length of vessel shell 12. The series of trays 14*a-f* includes an uppermost tray 14*a*, a plurality of intermediate trays 14*b-e*, and a lowermost tray 14*f*. Any, a majority, or all of trays 14*a-f* can have a length that is at least about 0.5 L, at least about 0.75 L, or at least 0.90 L. In one embodiment, each tray can be the same length or, alternatively, at least two trays can have different lengths.

Each tray 14*a-f* defines a receiving end and a discharge end. In the embodiment illustrated in FIG. 1, the receiving and discharge ends of vertically adjacent trays can be disposed at generally opposite ends of vessel shell 12 so that the receiving end of a lower tray 14*b,d,f* is positioned generally below the discharge end of an upper tray 14*a,c,e* of a vertically adjacent pair. Further, the receiving end of the lower trays 14*b,d,f* can be spaced outwardly from the discharge end of the upper trays 14*a,c,e* in order to create flow passageways 26*a,c,e* which allow fluid flow communication between vertically adjacent trays. In the embodiment illustrated in FIG. 1, the receiving end of trays 14*b,d,f* can be equipped with flow diverters 28*b,d,f*. Optionally, the discharge end of each tray 14*a-f* can be equipped with an upwardly extending weir 30*a-f*.

In the embodiment shown in FIG. 1, the receiving ends of trays 14*a,c,e* are directly coupled to the endcap 18*a*, while the discharge ends of trays 14*b,d,f* are spaced from endcap 18*a* in order to create flow passageways 26*b,d,f*, which facilitate fluid flow communication between vertically adjacent trays. Alternatively, the receiving ends of trays 14*c,e* can also be spaced from endcap 18*a* and can be positioned generally outwardly from the discharge end of trays 14*b,d*. As illustrated by the embodiment in FIG. 1, the receiving ends of trays 14*b,d,f* and the discharge ends of trays 14*a,c,e* are each spaced from endcap 18*b* so that an upward vapor flow passageway 32 is defined by the gap between the ends of trays 14*a-f* and endcap 18*b*. In one embodiment, vapor outlet 22 can be positioned near the top of upward flow passageway 32.

In the embodiment illustrated in FIGS. 1 and 2, trays 14*a-f* are substantially flat, substantially horizontal, substantially rectangular plates that each define a substantially horizontal, substantially planar, upwardly facing flow surface across which liquids can flow. As illustrated in FIG. 2, trays 14*a-f* divide the internal volume of vessel shell 12 into respective reactor flow chambers 42*a-g*. In order to provide sufficiently large flow chambers 42*a-g*, the upwardly facing flow surface of each tray 14*a-f* can be spaced from vertically adjacent trays by a vertical distance of at least about 0.05 D, at least about 0.10 D, or at least 0.25 D. The upwardly facing flow surface of each tray 14*a-f* can be spaced from vertically adjacent trays by a vertical distance in the range of from about 5 to about 50 inches, about 10 to about 40 inches, or 15 to 30 inches. In addition, each tray need not have a perfectly horizontal orientation. For example, at least two of the upwardly facing surfaces of trays 14*a-f* can be sloped by less than about 10, less than about 5, or less than about 2 degrees from horizontal.

In the embodiment illustrated in FIGS. 1 and 2, reactor 10 comprises six trays 14*a-f* having substantially parallel sides which are rigidly and sealingly coupled (e.g., welded) to the inside of tubular member 16. However, it should be noted that the number and configuration of trays disposed within vessel shell 12 can be optimized to match the application for which reactor 10 is employed. For example, reactor 10 could employ at least 2 trays, at least 4 trays, at least 6 trays, or in the range of from 4 to 15, or 5 to 10 trays. In addition, the sides of trays 14*a-f* could be spaced from the sidewalls of vessel shell 12 and could be supported in vessel shell 12 using a variety of support mechanisms such as, for example, support legs extending from the bottom of vessel shell 12 or suspension from the top of vessel shell 12.

Referring again to FIG. 1, in operation, a feed, which can be in a predominately liquid form, is introduced into reactor 10 and onto the receiving end of uppermost tray 14*a* via feed inlet 20. The feed then forms a reaction medium 34 that flows generally horizontally across and toward the discharge end of uppermost tray 14*a*. As reaction medium 34 flows along the upwardly facing surface of uppermost tray 14*a*, a chemical reaction takes place within reaction medium 34. A vapor 36 can be formed that comprises a byproduct of the chemical reaction carried out on the upwardly facing surface of tray 14*a* and/or a volatile component of the feed entering reactor 10 via feed inlet 20. At least a portion of vapor 36 is disengaged from and flows generally over reaction medium 34 as reaction medium 34 flows across uppermost tray 14*a*.

As shown in FIG. 1, in one embodiment of the present invention, the chemical reaction carried out in reactor 10 causes foaming of reaction medium 34, thereby producing a foam portion 38 and a predominantly liquid portion 40 of reaction medium 34. The chemical reaction can take place in the liquid phases of both foam portion 38 and predominantly liquid portion 40. In fact, the presence of foam can actually enhance certain chemical reactions, especially those reactions that are facilitated by increased liquid surface area and reduced pressure. Thus, in one embodiment, the internal volume and open flow area of the reactor flow chambers 42*a-g* are sufficiently large so that the maximum amount of foam formation is permitted. In applications where large amounts of foaming occur throughout a substantial portion of the reactor, it may be desired to employ a reduced number of trays in order to provide sufficient space within the reactor volume for maximum foam formation. Alternatively, a larger diameter vessel shell 12 can be employed to provide the necessary volume and open flow area to promote foam formation. As illustrated in FIGS. 1 and 2, the amount of foam produced by the reaction may decrease as reaction medium 34 progresses through reactor 10. Thus, reaction medium 34 on uppermost tray 14*a* can comprise more than about 50 volume percent, more than about 75 volume percent, or more than 90 volume percent vapor, while reaction medium 34 on lowermost tray 14*f* may comprise less than about 20 volume percent, less than about 10 volume percent, or less than 5 volume percent vapor.

Referring again to FIG. 1, when reaction medium 34 reaches the discharge end of uppermost tray 14*a*, it falls downwardly by gravity through flow passageway 26*a* and onto the portion of the receiving end of the first intermediate tray 14*b* that is spaced outwardly from the discharge end of uppermost tray 14*a*. When the discharge end of uppermost tray 14a is equipped with weir 30a, at least a portion of reaction medium 34 flows over the top, around the edges of, through openings in, and/or under weir 30a before falling onto the upwardly facing surface of first intermediate tray 14b. As reaction medium 34 exits uppermost tray 14a and flows downwardly onto first intermediate tray 14b, vapor flows upwardly from uppermost tray 14a and can combine with the vapor produced on subsequent trays 14c-f, as well as the vapor produced on the bottom of vessel shell 12. The resulting combined vapor can ascend through upward flow passage 32 prior to exiting reactor 10 via vapor outlet 22.

Weirs 30a-f can be employed in reactor 10 to help maintain the desired depth of reaction medium 34 on trays 14a-f. In one embodiment of the present invention, the maximum depth of the predominately liquid portion of reaction medium 34 on each tray is less than about 0.1 D, less than about 0.05 D, less than about 0.025 D, or less than 0.01 D. The maximum depth of reaction medium 34 on each tray can be about 1 to about 40 inches, about 1 to about 32 inches, or 1 to 24 inches.

As depicted in the embodiment shown in FIG. 1, reaction medium 34 flows from the receiving end of first intermediate tray 14b generally horizontally across the upwardly facing surface and toward the discharge end of tray 14b. As discussed previously, reaction medium 34 is subjected to chemical reaction as it passes along tray 14b, and the chemical reaction can cause the formation of a vapor byproduct and/or foam. When a vapor is produced by reaction medium 34 flowing along tray 14b, the vapor can flow above tray 14b countercurrent to the direction of flow of reaction medium 34 across tray 14b. The vapor can exit the space above tray 14b via a vapor passageway extending around and/or through the downwardly flowing reaction medium passing through flow passageway 26a. As illustrated in FIG. 1, the vapor passageway extending through the downwardly flowing reaction medium can be defined by a small tubular member.

When reaction medium 34 reaches the discharge end of tray 14b, it falls downwardly by gravity through flow passageway 26b and onto the portion of the receiving end of second intermediate tray 14c spaced outwardly from first intermediate tray 14b. When the discharge end of tray 14b is equipped with weir 30b, at least a portion of reaction medium 34 flows over the top of, around the edges of, through openings in, and/or under weir 30b prior to entering flow passageway 26b. Reaction medium 34 then flows along second intermediate tray 14c from the receiving end to the discharge end, as illustrated in FIG. 1. As discussed above, reaction medium 34 is subjected to chemical reaction as it passes along tray 14c, and the chemical reaction can cause the formation of a vapor byproduct and/or foam. When a vapor is produced, the vapor flows generally over reaction medium 34 in the same direction as reaction medium 34. When the vapor reaches the discharge end of tray 14c, the vapor flows toward upward flow passageway 32, where it can combine with vapor exiting trays 14a,b,d,e,f as shown in FIG. 1.

The flow of reaction medium 34 through the remaining intermediate trays 14d,e and lowermost tray 14f can proceed substantially the same as described above. In general, reaction medium 34 falls downwardly from the discharge end of trays 14c,d,e to the receiving end of trays 14d,e,f via flow passageways 26c,d,e. As discussed previously, reaction medium 34 flows in generally opposite directions on vertically adjacent trays so that reaction medium 34 flows generally back-and-forth through reactor 10 via trays 14d,e,f. If a vapor byproduct is created as the reaction medium travels across trays 14d,e,f, the vapor exits the space above trays 14d,e,f prior to combining with other vapor in upward flow passageway 32 and exiting reactor 10 via vapor outlet 22. As shown in the embodiment illustrated in FIG. 1, the reaction medium 34 exiting lowermost tray 14f flows along the bottom of vessel shell 12 prior to being withdrawn as a predominantly liquid product via product outlet 24.

Although not illustrated in FIG. 1, an impingement plate can be employed in the vapor flow path near vapor outlet 22 so that liquid entrained in the flowing vapor hits, collects on, and falls downwardly off the impingement plate. The use of an impingement plate helps ensure that only vapor exits vapor outlet 22 of reactor 10. In addition, although not illustrated in FIG. 1, an upwardly extending weir may be employed near product outlet 24 to help ensure an adequate level of the predominantly liquid portion 40 of reaction medium 34 is maintained along the bottom of vessel shell 12.

Horizontal trayed reactors configured in accordance with certain embodiments of the present invention require little or no mechanical agitation of the reaction medium processed therein. Although the reaction medium processed in the horizontal trayed reactor may be somewhat agitated by virtue of foaming, flowing through the reactor segments, and falling from one reactor segment to another, this foaming agitation, flow agitation, and gravitational agitation is not mechanical agitation. In one embodiment of the present invention, less than about 50 percent, less than about 25 percent, less than about 10 percent, less than about 5 percent, or 0 percent of the total agitation of the reaction medium processed in the horizontal trayed reactor is provided by mechanical agitation. Thus, reactors configured in accordance with certain embodiments of the present invention can operate without any mechanical mixing devices. This is in direct contrast to conventional continuous stirred tank reactors (CSTRs) which employ mechanical agitation almost exclusively.

As indicated above, horizontal trayed reactors configured in accordance with embodiments of the present invention reactors can be used in a variety of chemical processes. In one embodiment, a horizontal trayed reactor configured in accordance with the present invention is employed in a melt-phase polyester production facility capable of producing any of a variety of polyesters from a variety of starting materials. Examples of melt-phase polyesters that can be produced in accordance with embodiments of the present invention include, but are not limited to, polyethylene terephthalate (PET), which includes homopolymers and copolymers of PET; fully aromatic or liquid crystalline polyesters; biodegradable polyesters, such as those comprising butanediol, terephthalic acid and adipic acid residues; poly(cyclohexane-dimethylene terephthalate) homopolymer and copolymers; and homopolymers and copolymers of 1,4-cyclohexane-dimethanol (CHDM) and cyclohexane dicarboxylic acid or dimethyl cyclohexanedicarboxylate. When a PET copolymer is produced, such copolymer can comprise at least 90, at least 91, at least 92, at least 93, at least 94, at least 95, at least 96, at least 97, at least 98 mole percent of ethylene terephthalate repeat units and up to 10, up to 9, up to 8, up to 7, up to 6, up to 5, up to 4, up to 3, or up to 2 mole percent of added comonomer repeat units. Generally, the comonomer repeat units can be derived from one or more comonomers selected from the group consisting of isophthalic acid, 2,6-naphthaline-dicarboxylic acid, CHDM, and diethylene glycol.

In general, a polyester production process according to certain embodiments of the present invention can comprise two main stages—an esterification stage and a polycondensation stage. In the esterification stage, the polyester starting materials, which can comprise at least one alcohol and at least one acid, are subjected to esterification to thereby produce polyester monomers and/or oligomers. In the polycondensation stage, the polyester monomers and/or oligomers from the esterification stage are reacted into the final polyester product. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2, and a trimer 3, and so on.

The acid starting material employed in the esterification stage can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material employed in the esterification stage can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxy-ethoxyphenyl)-propane, 2,2-bis-(4-hydroxy-propoxyphenyl)-propane, isosorbide, hydroquinone, BDS-(2,2-(sulfonylbis)4,1-phenyleneoxy))bis(ethanol), and mixtures thereof.

In addition, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

Both the esterification stage and the polycondensation stage of a melt-phase polyester production process can include multiple steps. For example, the esterification stage can include an initial esterification step for producing a partially esterified product that is then further esterified in a secondary esterification step. Also, the polycondensation stage can include a prepolymerization step for producing a partially condensed product that is then subjected to a finishing step to thereby produce the final polymer product.

Reactors configured in accordance with certain embodiments of the present invention can be employed in a melt-phase polyester production system as a secondary esterification reactor for carrying out a secondary esterification step, as a prepolymer reactor for carrying out a prepolymerization step, and/or as a finisher reactor for carrying out a finishing step. A detailed description of the process conditions for the present invention employed as an esterification reactor, a prepolymer reactor, and/or a finisher reactor is given below with reference to FIG. 1. It is understood that reactors configured in accordance with embodiments of the present invention can generally be employed as esterification reactors, prepolymer reactors, and/or finisher reactors and that these process conditions are not limited to the embodiment described in FIG. 1, Referring again to FIG. 1, when reactor 10 is employed as a secondary esterification reactor in a melt-phase polyester production process (e.g., a process for making PET), more than one chemical reaction can be carried out in reactor 10. For example, although esterification may be the primary chemical reaction carried out in reactor 10, a certain amount of polycondensation may also occur in reactor 10. When reactor 10 is employed as a secondary esterification reactor, the feed introduced into feed inlet 20 can have a conversion in the range of from about 70 to about 95 percent, about 75 to about 90 percent, or 80 to 88 percent, while the predominately liquid product withdrawn from liquid product outlet 24 can have a conversion of at least about 80 percent, at least about 90 percent, at least about 95 percent, or at least 98 percent. When reactor 10 is employed as a secondary esterification reactor, the chemical reaction(s) carried out in reactor 10 can increase the conversion of reaction medium 34 by at least about 2 percentage points, at least about 5 percentage points, or at least 10 percentage points between feed inlet 20 and liquid product outlet 24. Further, the average chain length of the feed introduced into feed inlet 20 can be less than about 5, less than about 2 or less than 1, while the predominately liquid product withdrawn from liquid product outlet 24 can have an average chain length in the range of from about 1 to about 20, about 2 to about 12, or 5 to 12. Generally, when reactor 10 is employed as a secondary esterification reactor, the average chain length of reaction medium 34 can increase in the range of from about 1 to about 20, about 2 to about 15, or 5 to 12 between feed inlet 20 and liquid product outlet 24.

When reactor 10 is employed as a secondary esterification reactor, the feed to reactor 10 can enter feed inlet 20 at a temperature in the range of from about 180 to about 350° C., about 215 to about 305° C., or 260 to 290° C. The predominately liquid product exiting liquid product outlet 24 can have a temperature within about 50° C., 25° C., or 10° C. of the temperature of the feed entering feed inlet 20. In one embodiment, the temperature of the liquid product exiting liquid product outlet 24 can be in the range of from about 180 to about 350° C., about 215 to about 305° C., or 260 to 290° C. In one embodiment, the average temperature of reaction medium 34 in reactor 10 is in the range of from about 180 to about 350° C., about 215 to about 305° C., or 260 to 290° C. The average temperature of reaction medium 34 is the average of at least three temperature measurements taken at equal spacings along the primary flow path of reaction medium 34 through reactor 10, where the temperature measurements are each taken near the cross sectional centroid of predominately liquid portion 40 of reaction medium 34 (as opposed to near the wall of the reactor or near the upper surface of the predominately liquid portion). When reactor 10 is employed as a secondary esterification reactor, the vapor space pressure in reactor 10 (measured at vapor outlet 22) can be maintained at less than about 70 psig, in the range of from about −4 to about 10 psig, or in the range of from 2 to 5 psig.

When reactor 10 is employed as a secondary esterification reactor, it may be desirable to heat the feed prior to introduction into reactor 10 and/or it may be desirable to heat reaction medium 34 as it flows through reactor 10. The heating of the feed prior to introduction into reactor 10 can be carried out in a conventional heat exchanger such as, for example, a shell-and-tube heat exchanger. The heating of reaction medium 34 in reactor 10 can be carried out by external heating devices that contact reactor 10, but do not extend into the interior of reactor 10. Such external heat exchange devices include, for example, jacketing and/or heat-tracing. Generally, the cumulative amount of heat added to the feed immediately upstream of reactor 10 plus the heat added to reaction medium 34 in reactor 10 can be in the range of from about 100 to about 5,000 BTU per pound of reaction medium (BTU/lb), in the range of from about 400 to about 2,000 BTU/lb, or in the range of from 600 to 1,500 BTU/lb.

Referring again to FIG. 1, when reactor 10 is employed as a prepolymer reactor in a melt-phase polyester production process (e.g., a process for making PET), more than one chemical reaction can be carried out in reactor 10. For example, although polycondensation may be the predominate chemical reaction carried out in reactor 10, a certain amount of esterification may also occur in reactor 10. When reactor 10 is employed as a prepolymer reactor, the average chain length of the feed introduced into feed inlet 20 can be in the range of from about 1 to about 20, about 2 to about 15, or 5 to 12, while the average chain length of the predominately liquid product withdrawn from liquid product outlet 24 can be in the range of from about 5 to about 50, about 8 to about 40, or 10 to 30. When reactor 10 is employed as a prepolymerization reactor, the chemical reaction carried out in reactor 10 can cause the average chain length of reaction medium 34 to increase by at least about 2, in the range of from about 5 to about 30, or in the range of from 8 to 20 between feed inlet 20 and liquid product outlet 24.

When reactor 10 is employed as a prepolymer reactor, the feed can enter feed inlet 20 at a temperature in the range of from about 220 to about 350° C., about 265 to about 305° C., or 270 to 290° C. The predominately liquid product exiting liquid product outlet 24 can have a temperature within about 50° C., 25° C., or 10° C. of the temperature of the feed entering feed inlet 20. In one embodiment, the temperature of the liquid product exiting liquid product outlet 24 is in the range of from about 220 to about 350° C., about 265 to about 305° C., or 270 to 290° C. In one embodiment, the average temperature of reaction medium 34 in reactor 10 is in the range of from about 220 to about 350° C., about 265 to about 305° C., or 270 to 290° C. When reactor 10 is employed as a prepolymer reactor, the vapor space pressure in reactor 10 (measured at vapor outlet 22) can be maintained in the range of from about 0 to about 300 torr, in the range of from about 1 to about 50 torr, or in the range of from 20 to 30 torr.

When reactor 10 is employed as a prepolymer reactor, it may be desirable to heat the feed prior to introduction into reactor 10 and/or it may be desirable to heat reaction medium 34 as it flows through reactor 10. Generally, the cumulative amount of heat added to the feed immediately upstream of reactor 10 plus the heat added to reaction medium 34 in reactor 10 can be in the range of from about 100 to about 5,000 BTU/lb, in the range of from about 400 to about 2,000 BTU/lb, or in the range of from 600 to 1,500 BTU/lb.

Referring again to FIG. 1, when reactor 10 is employed as a finisher reactor in a melt-phase polyester production process (e.g., a process for making PET), the average chain length of the feed introduced into feed inlet 20 can be in the range of from about 5 to about 50, about 8 to about 40, or 10 to 30, while the average chain length of the predominately liquid product withdrawn from liquid product outlet 24 can be in the range of from about 30 to about 210, about 40 to about 80, or 50 to 70. Generally, the polycondensation carried out in reactor 10 can cause the average chain length of reaction medium 34 to increase by at least about 10, at least about 25, or at least 50 between feed inlet 20 and liquid product outlet 24.

When reactor 10 is employed as a finisher reactor, the feed can enter feed inlet 20 at a temperature in the range of from about 220 to about 350° C., about 265 to about 305° C., or 270 to 290° C. The predominately liquid product exiting liquid product outlet 24 can have a temperature within about 50° C., 25° C., or 10° C. of the temperature of the feed entering feed inlet 20. In one embodiment, the temperature of the liquid product exiting liquid product outlet 24 is in the range of from about 220 to about 350° C., about 265 to about 305° C., or 270 to 290° C. In one embodiment, the average temperature of reaction medium 34 in reactor 10 is in the range of from about 220 to about 350° C., about 265 to about 305° C., or 270 to 290° C. When reactor 10 is employed as a finisher reactor, the vapor space pressure in reactor 10 (measured at vapor outlet 22) can be maintained in the range of from about 0 to about 30 torr, in the range of from about 1 to about 20 torr, or in the range of from 2 to 10 torr.

Reactors configured in accordance with embodiments of the present invention can provide numerous advantages when employed as reactors in the esterification and/or polycondensation stages of a polyester production process. Such reactors can be particularly advantageous when employed as secondary esterification, prepolymer, and/or finisher reactors in a process for making PET. Further, such reactors are well suited for use in commercial scale PET production facilities capable of producing PET at a rate of at least about 10,000 pounds per hours, at least about 100,000 pounds per hour, at least about 250,000 pounds per hour, or at least 500,000 pounds per hour.

In one embodiment of the present invention, there is provided a process comprising: flowing a reaction medium through a reactor comprising a horizontally elongated vessel shell and a plurality of vertically spaced trays disposed in the vessel shell, wherein the reaction medium flows across at least two of the trays as the reaction medium passes through the reactor. The features described for the vessel shell, the trays, and the reaction medium flow path for the embodiments shown in FIGS. 1 and 2 apply generally to this embodiment of the present invention.

In one example, the vessel shell is elongated along a central axis of elongation that extends at an angle within about 5 degrees of horizontal and each of the trays presents a substantially planar upwardly facing surface across which at least a portion of the reaction medium flows, wherein the upwardly facing surfaces of at least two of the trays are sloped from horizontal by less than about 5 degrees. In one example, the central axis of elongation is substantially horizontal and the upwardly facing surfaces of each of the trays are substantially horizontal.

In one example, the vessel shell has a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1. In addition to the specified L:D ratios, the majority of the trays can have a length of at least about 0.5 L, at least about 0.75 L, or at least 0.9 L. Furthermore, the diameter can be in the range of from about 2 to about 40 feet, about 6 to about 30 feet, or 10 feet to 20 feet, and L can be in the range of from about 5 to about 100 feet, about 10 to about 60 feet, or 15 feet to 40 feet.

In one example, the vessel shell has a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1 and each of the trays presents a substantially planar upwardly facing surface across which at least a portion of the reaction medium flows, and the upwardly facing surfaces of vertically adjacent ones of the trays are spaced from one another by a vertical distance of at least about 0.05 D, at least about 0.10 D, or at least 0.25 D. The upwardly facing flow surface of each tray can be spaced from vertically adjacent trays by a vertical distance in the range of from about 5 to about 50 inches, about 10 to about 40 inches, or 15 to 30 inches.

In one example, the reaction medium is subjected to a chemical reaction as the reaction medium flows through the reactor. A vapor, comprising a byproduct of the chemical reaction, can be produced as the reaction medium flows through the reactor. In one example, the vapor produced on a plurality of the trays is combined in the vessel shell and the combined vapor exits the reactor via a vapor outlet located near the top of the vessel shell.

In one example, the reaction medium is subjected to a chemical reaction and a foam is produced as the reaction medium flows through the reactor so that the reaction medium comprises a foam portion and a predominately liquid portion, wherein the chemical reaction is carried out in the liquid phases of both the foam portion and the predominately liquid portion.

In one example of the present invention there is provided a process comprising flowing a reaction medium through a reactor comprising a horizontally elongated vessel shell and a plurality of vertically spaced trays disposed in the vessel shell, wherein the reaction medium flows across at least two of the trays and is subject to esterification and/or polycondensation reactions as the reaction medium passes through the reactor. The detailed description of FIG. 1 reactor 10 employed as a second stage esterification, prepolymerization, and/or finisher reactor given above applies to this example of the present invention. Specifically the feed characteristics (e.g., conversion and/or chain length), temperature, pressure, conversion increase, average chain length increase, product characteristics, and any heat input all apply to this example of the present invention.

In one example, a product is removed from a product outlet of the reactor, wherein the reaction medium forms the product in the reactor. Additionally, when the chemical reaction comprises polycondensation, the product can be a polycondensation product. The It.V. of the product or polycondensation product can be in the range of from about 0.3 to about 1.2, about 0.35 to about 0.6, or 0.4 to 0.5 dL/g. In one example, It.V. of the product or polycondensation product is in the range of from about 0.1 to about 0.5, about 0.1 to about 0.4, or 0.15 to 0.35 dL/g. In one example, a feed is introduced to a feed inlet of the reactor to form the reaction medium and the It.V. of the feed is in the range of from about 0.1 to about 0.5, about 0.1 to about 0.4, or 0.15 to 0.35 dL/g.

The Intrinsic viscosity (It.V.) values are set forth in dL/g units as calculated from the inherent viscosity measured at 25° C. in 60% phenol and 40% 1,1,2,2-tetrachloroethane by weight. Polymer samples can be dissolved in the solvent at a concentration of 0.25 g/50 mL. The viscosity of the polymer solutions can be determined, for example, using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = lim(\eta_{sp}/C) = lim(\ln \eta_r)/C$$
$$C \to 0 \quad C \to 0$$

where $\eta_{int}$=Intrinsic viscosity
$\eta_r$=Relative viscosity=$t_s/t_o$
$\eta_{sp}$=Specific viscosity=$\eta_r - 1$ The intrinsic viscosity (It.V. or $\eta_{int}$) may be estimated using the Billmeyer equation as follows:

$$\eta_{int} = 0.5[e^{0.5 \times Ih.V.} - 1] + (0.75 \times Ih.V.)$$

The reference for estimating intrinsic viscosity (Billmeyer relationship) is J. *Polymer Sci.*, 4, pp. 83-86 (1949).

The viscosity of the polymer solutions can also be determined using a Viscotek Modified Differential Viscometer (a description of the operating principle of the differential pressure viscometers can be found in ASTM D 5225) or other methods known to one skilled in the art.

In another embodiment of the present invention, there is provided a process comprising: (a) introducing a predominantly liquid feed into a polycondensation reactor, wherein the feed forms a reaction medium in the reactor, wherein the feed comprises PET having an average chain length in the range of from about 5 to about 50, about 8 to about 40, or 10 to 30; (b) subjecting the reaction medium to polycondensation in the reactor to thereby provide a predominantly liquid product and a vapor, wherein the vapor comprises a byproduct of the polycondensation, wherein the reactor comprises a substantially horizontal, elongated vessel shell and at least two substantially horizontal, vertically spaced trays disposed in the vessel shell, wherein at least a portion of the reaction medium flows across the trays as the reaction medium undergoes polycondensation, wherein the reaction medium flows in generally opposite directions on vertically adjacent ones of the trays and falls by gravity between the trays, wherein the vessel shell has a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1, wherein a majority of the trays has a length of at least about 0.5 L, at least about 0.75 L, or at least 0.9 L wherein the vessel shell comprises a substantially cylindrical pipe and a pair of endcaps coupled to opposite ends of the pipe; (c) discharging the vapor from the reactor via a vapor outlet located near the top of the vessel shell; and (d) discharging the product from the reactor via a product outlet located near the bottom of the vessel shell, wherein the product comprises PET having an average chain length that is at least about 10, at least about 25, or at least 50 greater than the average chain length of the feed. The features described for the vessel shell, the trays, and the reaction medium flow path for the embodiments shown in FIGS. 1 and 2 apply generally to this embodiment of the present invention.

In one example, the It.V. of the feed is in the range of from about 0.1 to about 0.5, about 0.1 to about 0.4, or about 0.15 to about 0.35 dL/g. In one example, the It.V. of or product is in the range of from about 0.3 to about 1.2, about 0.35 to about 0.6, or 0.4 to 0.5 dL/g.

In one example, the vessel shell has a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1. Additionally, the diameter can be in the range of from about 2 to about 40 feet, about 6 to about 30 feet, or 10 feet to 20 feet, and L can be in the range of from about 5 to about 100 feet, about 10 to about 60 feet, or 15 feet to 40 feet.

In a further embodiment of the present invention, there is provided a reactor comprising a horizontally elongated vessel shell and at least two vertically spaced trays disposed in the vessel shell. The features described for the vessel shell, the trays, and the reaction medium flow path for the embodiments shown in FIGS. 1 and 2 apply generally to this embodiment of the present invention.

In one example, the reactor has a vessel shell with a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1. In addition to the specified L:D ratios, the majority of the trays can have a length of at least about 0.5 L, at least about 0.75 L, or at least 0.9 L. Furthermore, the reactor diameter can be in the range of from about 2 to about 40 feet, about 6 to about 30 feet, or 10 feet to 20 feet, and L can be in the range of from about 5 to about 100 feet, about 10 to about 60 feet, or 15 feet to 40 feet.

In one example, the reactor has a vessel shell with a length-to-diameter (L:D) ratio in the range of from about 1.1:1 to about 50:1, about 1.2:1 to about 30:1, about 1.25:1 to about 15:1, about 1.5:1 to about 10:1, or 2:1 to 6:1 and each of the reactor trays presents a substantially planar upwardly facing surface, wherein the upwardly facing surfaces of vertically adjacent ones of said trays are spaced from one another by a vertical distance of at least about 0.05 D, at least about 0.1 D, or at least 0.25 D. The upwardly facing flow surface of each tray can be spaced from vertically adjacent trays by a vertical distance in the range of from about 5 to about 50 inches, about 10 to about 40 inches, or 15 to 30 inches.

In one example, the reactor comprises at least 2 trays, at least 4 trays, at least 6 trays, or in the range of from 4 to 15, or 5 to 10 trays.

In one example, the reactor vessel shell is elongated along a central axis of elongation that extends at an angle within about 10, about 5, or 2 degrees of horizontal, wherein each of the trays presents a substantially planar upwardly facing surface, wherein the upwardly facing surfaces of at least two of the trays are sloped from horizontal by less than about 10 degrees, less than about 5 degrees, or less than 2 degrees.

Numerical Ranges

The present description uses numerical ranges to quantify certain parameters relating to the invention. It should be understood that when numerical ranges are provided, such ranges are to be construed as providing literal support for claim limitations that only recite the lower value of the range, as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromotagraphy (GPC) measurements and/or viscosity measurements.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "esterification" refers to both esterification and ester exchange reactions.

As used herein, the terms "having," "has," and "have" have the same open-ended meaning as "comprising," "comprises," and "comprise," provided above.

As used herein, the term "horizontally elongated" means that the maximum horizontal dimension is larger than the maximum vertical dimension.

As used herein, the terms "including," "includes," and "include" have the same open-ended meaning as "comprising," "comprises," and "comprise," provided above.

As used herein, the term, "mechanical agitation" refers to agitation of a reaction medium caused by physical movement of a rigid or flexible element(s) against or within the reaction medium.

As used herein, the term "open flow area" refers to the open area available for fluid flow, where the open area is measured along a plane that is perpendicular to the direction of flow through the opening.

As used herein, the term "pipe" refers to a substantially straight elongated tubular member having a generally cylindrical sidewall.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 10 mole percent with one or more added comonomers. For example, the terms "polyethylene terephthalate copolymer" and "PET copolymer" include PET modified with up to 10 mole percent isophthalic acid on a 100 mole percent carboxylic acid basis. In another example, the terms "polyethylene terephthalate copolymer" and "PET copolymer" include PET modified with up to 10 mole percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "vapor byproduct" includes the vapor generated by a desired chemical reaction (i.e., a vapor coproduct) and any vapor generated by other reactions (i.e., side reactions) of the reaction medium.

CLAIMS NOT LIMITED TO DISCLOSED EMBODIMENTS

The exemplary embodiments of the invention described above are to be used as illustration only, and should not be used in a limiting sense to interpret the scope of the claimed invention. Various modifications to the above-described exemplary embodiments could be readily made by those skilled in the art without departing from the scope of the invention as set forth in the following claims.

What is claimed is:

1. A process comprising: introducing a polycondensation feed into a feed inlet of a reactor, wherein said polycondensation feed comprises PET and forms said reaction medium in said reactor, flowing said reaction medium through said reactor comprising a horizontally elongated vessel shell and a plurality of vertically spaced trays disposed in said vessel shell, wherein said reaction medium flows across at least two of said trays as said reaction medium passes through said reactor, wherein said reaction medium is subjected to a polycondensation reaction as said reaction medium flows through said reactor.

2. The process of claim 1, wherein said reaction medium flows in opposite directions on vertically adjacent ones of said trays, so that said reaction medium flows back-and-forth through said reactor.

3. The process of claim 1, wherein said reaction medium falls by gravity between said trays as said reaction medium flows through said reactor.

4. The process of claim 1, wherein said reactor comprises at least four of said trays.

5. The process of claim 1, wherein said vessel shell is elongated along a central axis of elongation that extends at an angle within about 5 degrees of horizontal, wherein all of said trays presents a substantially planar upwardly facing surface across which at least a portion of said reaction medium flows, wherein said upwardly facing surfaces of at least two of said trays are sloped from horizontal by less than about 5 degrees.

6. The process of claim 5, wherein said central axis of elongation is substantially horizontal, wherein said upwardly facing surfaces of all of said trays are substantially horizontal.

7. The process of claim 1, wherein said vessel shell has a length-to-diameter (L:D) ratio in the range of from about 1.1:1 to about 50:1.

8. The process of claim 7, wherein a majority of said trays has a length of at least about 0.5 L.

9. The process of claim 8, wherein D is in the range of from about 2 to about 40 feet.

10. The process of claim 9, wherein said L:D ratio is in the range of from about 1.25:1 to about 15:1.

11. The process of claim 7, wherein said reaction medium comprises a predominately liquid portion, wherein the maximum depth of said predominately liquid portion on said trays is less than about 0.1 D.

12. The process of claim 7, wherein all of said trays presents a substantially planar upwardly facing surface across which at least a portion of said reaction medium flows, wherein said upwardly facing surfaces of vertically adjacent ones of said trays are spaced from one another by a vertical distance of at least about 0.05 D.

13. The process of claim 1, wherein said vessel shell comprises a substantially straight, horizontally elongated tubular member and a pair of end caps coupled to opposite ends of said tubular member.

14. The process of claim 13, wherein said tubular member is a substantially cylindrical pipe.

15. The process of claim 13, wherein all of said trays presents substantially parallel sides that are sealingly coupled to the inside of said tubular member.

16. The process of claim 13, wherein all of said trays is spaced from one of said end caps to thereby provide an upward flow passageway adjacent said one of said end caps, wherein said vessel shell defines a vapor outlet near the top of said upward flow passageway.

17. The process of claim 1, wherein at least one of said trays comprises a weir, wherein said reaction medium flows over, under, around, and/or through said weir prior to exiting said tray.

18. The process of claim 1, wherein a vapor is produced as said reaction medium flows through said reactor, wherein said vapor comprises a byproduct of said polycondensation reaction.

19. The process of claim 18, wherein said vapor produced on a plurality of said trays is combined in said vessel shell and the combined vapor exits said reactor via a vapor outlet located near the top of said vessel shell.

20. The process of claim 1, wherein foam is produced as said reaction medium flows through said reactor so that said reaction medium comprises a foam portion and a predominately liquid portion, wherein said polycondensation reaction is carried out in the liquid phases of both said foam portion and said predominately liquid portion.

21. The process of claim 1, wherein said PET in said polycondensation feed has an average chain length in the range of from about 5 to about 50, wherein the average chain length of said PET in said reaction medium increases by at least about 10 in said reactor.

22. The process of claim 21, wherein said polycondensation feed is maintained at a temperature in the range of from about 220 to about 350° C., wherein the vapor space pressure in said reactor is maintained in the range of from about 0 to about 30 torr.

23. The process of claim 1, wherein the portion of said reaction medium located on an uppermost one of said trays comprises at least 50 volume percent vapor and the portion of said reaction medium located on a lowermost one of said trays comprises less than 20 volume percent vapor.

24. The process of claim 1, wherein said PET is a PET copolymer comprising at least about 90 mole percent ethylene terephthalate repeat units and up to about 10 mole percent of added comonomer repeat units.

25. The process of claim 24, wherein said added comonomer repeat units are derived from an added comonomer selected from the group consisting of isophthalic acid, 2,6-naphthaline-dicarboxylic acid, 1,4-cyclohexane-dimethanol, diethylene glycol, and combinations of two or more thereof.

26. The process of claim 25, wherein said added comonomer comprises isophthalic acid.

27. The process of claim 1, wherein said PET is produced by said reactor at a rate of at least about 10,000 pounds per hour.

28. The process of claim 1, wherein the average chain length of said PET in said reaction medium increases by at least about 2 in said reactor.

29. The process of claim 28, wherein said PET in said polycondensation feed has an average chain length in the range of from about 1 to about 20.

30. The process of claim 29, wherein said polycondensation feed is maintained at a temperature in the range of from about 220 to about 350° C., wherein the vapor space pressure in said reactor is maintained in the range of from about 0 to about 300 torr.

31. The process of claim 1, wherein said reactor comprises no mechanical mixing device.

32. A process for making polyethylene terephthalate (PET), said process comprising:
(a) introducing a predominately liquid polycondensation feed into a polycondensation reactor, wherein said polycondensation feed forms a reaction medium in said reactor, wherein said polycondensation feed comprises PET having an average chain length in the range of from about 5 to about 50;
(b) subjecting said reaction medium to a polycondensation reaction in said reactor to thereby provide a predominately liquid polycondensation product and a vapor, wherein said vapor comprises a byproduct of said polycondensation reaction, wherein said reactor comprises a substantially horizontal, elongated vessel shell and at least two substantially horizontal, vertically spaced trays disposed in said vessel shell, wherein at least a portion of said reaction medium flows across said trays as said reaction medium undergoes said polycondensation reaction, wherein said reaction medium flows in opposite directions on vertically adjacent ones of said trays and falls by gravity between said trays, wherein said vessel shell has a length-to-diameter (L:D) ratio in the range of from about 1.2:1 to about 30:1, wherein a majority of said trays has a length of at least about 0.5 L, wherein said vessel shell comprises a substantially cylindrical pipe and a pair of end caps coupled to opposite ends of said pipe;
(c) discharging said vapor from said reactor via a vapor outlet located near the top of said vessel shell; and
(d) discharging said polycondensation product from said reactor via a product outlet located near the bottom of said vessel shell, wherein said polycondensation product comprises PET having an average chain length that is at least about 10 greater than the average chain length of said polycondensation feed.

33. The process of claim 32, wherein said reactor comprises in the range of from 4 to 15 of said trays.

34. The process of claim 32, wherein said L:D ratio is in the range of from about 1.5:1 to about 10:1, wherein D is in the range of from about 2 to about 40 feet.

35. The process of claim 32, wherein said reaction medium comprises a predominately liquid portion, wherein the maximum depth of said predominately liquid portion on said trays is less than about 0.1 D.

36. The process of claim 32, wherein all of said trays presents substantially parallel sides that are sealingly coupled to the inside of said pipe.

37. The process of claim 32, wherein said vapor produced on a plurality of said trays is combined in said vessel shell and the combined vapor exits said reactor via said vapor outlet.

38. The process of claim 37, wherein all of said trays is spaced from one of said end caps to thereby provide an upward flow passageway adjacent said one of said end caps, wherein said vapor produced on a plurality of said trays is combined in said upward flow passageway.

39. The process of claim 32, wherein foam is produced as said reaction medium flows through said reactor so that said reaction medium comprises a foam portion and a predominately liquid portion, wherein said polycondensation reaction is carried out in the liquid phases of both of said foam portion and said predominately liquid portion.

40. The process of claim 32, wherein said reaction medium in said reactor is maintained at a temperature in the range of from about 220 to about 350° C. and a pressure in the range of from about 0 to about 30 torr.

41. A reactor for processing a reaction medium flowing therethrough, said reactor comprising: a horizontally elongated vessel shell and at least two vertically spaced trays disposed in said vessel shell, wherein said vessel shell defines a feed inlet, a vapor outlet, and a liquid outlet, wherein said feed inlet and said vapor outlet are located near the top of said vessel shell, wherein said liquid outlet is located near the bottom of said vessel shell, wherein all of said at least two trays defines a receiving end and a discharge whereby a flow passageway allows fluid communication between vertically adjacent ones of said at least two trays, wherein said flow passageways are configured to direct the reaction medium to flow in opposite directions on said vertically adjacent ones of said at least two trays and to fall by gravity between said vertically adjacent ones of said at least two trays.

42. The reactor of claim 41, wherein said vessel shell has a length-to-diameter (L:D) ratio in the range of from about 1.1:1 to about 50:1.

43. The reactor of claim 42, wherein a majority of said trays has a length of at least about 0.5 L.

44. The reactor of claim 43, wherein D is in the range of from about 2 to about 40 feet.

45. The reactor of claim 44, wherein L:D ratio is in the range of from about 1.25:1 to about 15:1.

46. The reactor of claim 42, wherein all of said trays presents a substantially planar upwardly facing surface, wherein said upwardly facing surfaces of vertically adjacent ones of said trays are spaced from one another by a vertical distance of at least about 0.05 D.

47. The reactor of claim 41, wherein said reactor comprises in the range of from 4 to 15 of said trays.

48. The reactor of claim 41, wherein said vessel shell is elongated along a central axis of elongation that extends at an angle within about 5 degrees of horizontal, wherein all of said trays presents a substantially planar upwardly facing surface, wherein said upwardly facing surfaces of at least two of said trays are sloped from horizontal by less than about 5 degrees.

49. The reactor of claim 48, wherein said central axis of elongation is substantially horizontal, wherein said upwardly facing surfaces of all of said trays are substantially horizontal.

50. The reactor of claim 41, wherein said vessel shell comprises a substantially straight, horizontally elongated tubular member and a pair of end caps coupled to opposite ends of said tubular member.

51. The reactor of claim 50, wherein said tubular member is a substantially cylindrical pipe.

52. The reactor of claim 50, wherein all of said trays presents substantially parallel sides that are sealingly coupled to the inside of said tubular member.

53. The reactor of claim 50, wherein all of said trays is spaced from one of said end caps to thereby define an upward flow passageway adjacent said one of said end caps.

54. The process of claim 1, wherein said PET in said polycondensation feed has an It.V. in the range of from 0.1 to 0.5 dL/g.

55. The process of claim 1, further comprising removing a polycondensation product from a product outlet of said reactor, wherein said reaction medium forms said polycondensation product in said reactor, wherein the It.V. of said PET in said polycondensation product is in the range of from about 0.3 to about 1.2 dL/g.

56. The process of claim 21, further comprising removing a polycondensation product from a product outlet of said reactor, wherein said reaction medium forms said polycondensation product, wherein the It.V. of said PET in said polycondensation product is in the range of from about 0.3 to about 1.2 dL/g.

57. The process of claim 32, wherein the It.V. of said PET in said polycondensation feed is in the range of from 0.1 and 0.5 dL/g.

58. The process of claim 32, wherein the It.V. of said PET in said polycondensation product is in the range of from 0.3 to 1.2 dL/g.

* * * * *